United States Patent
Kubo et al.

(10) Patent No.: US 10,584,799 B2
(45) Date of Patent: Mar. 10, 2020

(54) PRESSURE REDUCTION VALVE DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Toshikatsu Kubo, Obu (JP); Masayuki Sekine, Okazaki (JP); Akira Nakano, Okazaki (JP); Shota Yamamoto, Toyota (JP); Yutaka Hotta, Toyota (JP); Akira Yamashita, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 15/715,945

(22) Filed: Sep. 26, 2017

(65) Prior Publication Data

US 2018/0087682 A1   Mar. 29, 2018

(30) Foreign Application Priority Data

Sep. 29, 2016 (JP) .................................. 2016-191886

(51) Int. Cl.
  *F16K 17/06*   (2006.01)
  *G05D 16/10*   (2006.01)
  *F16K 27/04*   (2006.01)

(52) U.S. Cl.
  CPC ............ *F16K 17/065* (2013.01); *F16K 27/04* (2013.01); *G05D 16/107* (2019.01); *Y10T 137/7826* (2015.04)

(58) Field of Classification Search
  CPC ......... Y10T 137/7826; Y10T 137/7793; Y10T 137/7827; Y10T 137/7822; G05D 16/107; F16K 17/065; F16K 27/04

(Continued)

(56) References Cited

U.S. PATENT DOCUMENTS

2006/0138378 A1   6/2006 Kay
2008/0202603 A1   8/2008 Shima et al.
(Continued)

FOREIGN PATENT DOCUMENTS

| JP | 2006-185103 A | 7/2006 |
| JP | 2011-108057 A | 6/2011 |
| JP | 2015-219895 A | 12/2015 |

OTHER PUBLICATIONS

Feb. 16, 2018 Search Report issued in European Patent Application No. 17193851.7.

*Primary Examiner* — Kevin F Murphy
*Assistant Examiner* — Kelsey E Cary
(74) *Attorney, Agent, or Firm* — Oliff PLC (57) ABSTRACT

In a pressure reduction valve device, a valve body and a distal end portion of a support member are accommodated in a valve accommodation hole of a body. The distal end portion is inserted through an urging member accommodation hole. An inner introduction passage is formed between an outer peripheral surface of the distal end portion and an inner peripheral surface of the urging member accommodation hole. An outer introduction passage is formed between an outer surface of the valve body and an inner surface of the valve accommodation hole. The support member is provided with communication holes that establish communication between a gas inlet provided through the body and the valve accommodation hole in an axial direction. The inner introduction passage and the outer introduction passage are opposed, in an axial direction thereof, to the communication passage.

3 Claims, 3 Drawing Sheets

(58) Field of Classification Search
USPC .............. 137/505, 505.38, 505.41, 505.42; 251/635.5, 63.6
See application file for complete search history.

(56) References Cited

U.S. PATENT DOCUMENTS

2009/0308465 A1  12/2009  Suzuki et al.
2011/0114867 A1  5/2011   Suzuki et al.

PRESSURE REDUCTION VALVE DEVICE

INCORPORATION BY REFERENCE

The disclosure of Japanese Patent Application No. 2016-191886 filed on Sep. 29, 2016 including the specification, drawings and abstract is incorporated herein by reference in its entirety.

BACKGROUND

1. Technical Field

The disclosure relates to a pressure reduction valve device.

2. Description of Related Art

As described in Japanese Patent Application Publication No. 2011-108057 (JP 2011-108057 A) and Japanese Patent Application Publication No. 2006-185103 (JP 2006-185103 A), there is known a pressure reduction valve device in which a valve body moves onto/away from a valve seat due to a differential pressure between a pressure adjustment chamber and a pressure reduction chamber and an elastic force of an urging member. In the aforementioned pressure reduction valve device, a gas flow channel is formed between an outer surface of the valve body and an inner surface of an accommodation portion that accommodates the valve body. Hydrogen gas is supplied into the flow channel. The supplied hydrogen gas flows into the pressure reduction chamber, and the pressure in the pressure reduction chamber rises. When the pressure in the pressure reduction chamber becomes higher than the pressure in the pressure adjustment chamber, a force that is produced on a piston due to the differential pressure between the pressure in the pressure reduction chamber and the pressure in the pressure adjustment chamber acts in such a manner as to resist the elastic force of the urging member, so the valve body moves onto the valve seat. Besides, the hydrogen gas in the pressure reduction chamber flows out from a gas outlet, so the pressure in the pressure reduction chamber falls. When the pressure in the pressure reduction chamber becomes lower than the pressure in the pressure adjustment chamber, the piston moves due to the force that is produced on the piston due to the differential pressure between the pressure in the pressure reduction chamber and the pressure in the pressure adjustment chamber, and the elastic force of the urging member, and the valve body moves away from the valve seat.

SUMMARY

In general, hydrogen gas contains moisture. In the aforementioned pressure reduction valve device, moisture is considered to adhere to a region between the outer surface of the valve body and the inner surface of the accommodation portion that accommodates the valve body. In the configuration of Japanese Patent Application Publication No. 2011-108057 (JP 2011-108057 A), when the amount of adhering moisture is large, the operation of the valve body may be hindered through the freezing of the moisture. Therefore, there is a demand to reduce the amount of moisture adhering to the region between the outer surface of the valve body and the inner surface of the accommodation portion that accommodates the valve body.

In the configuration of Japanese Patent Application Publication No. 2006-185103 (JP 2006-185103 A), hydrogen gas is supplied to an accommodation hole of the valve body that accommodates a valve spring as well as the region between the outer surface of the valve body and the accommodation portion that accommodates the valve body. Therefore, the amount of moisture adhering to the region between the outer surface of the valve body and the inner surface of the accommodation portion that accommodates the valve body can be reduced. However, in the configuration of Japanese Patent Application Publication No. 2006-185103 (JP 2006-185103 A), a through-hole (17) through which hydrogen gas is supplied is smaller in diameter than an accommodation hole of a valve body (20) for a valve spring (21), and is concentrically opposed to the accommodation hole. Therefore, the force by which hydrogen gas pushes up the valve body may become too large, and hence the operation of the valve body may be hindered. Incidentally, the aforementioned reference numerals are used in Japanese Patent Application Publication No. 2006-185103 (JP 2006-185103 A).

The disclosure provides a pressure reduction valve device that can maintain appropriate operation of a valve body.

As a premise, a pressure reduction valve device according to an aspect of the disclosure is equipped with a body, a valve mechanism, a cylinder, a piston, and a support member. The body has a valve accommodation hole. The valve mechanism is accommodated in the valve accommodation hole. The cylinder is provided on the body downstream of the valve mechanism. The piston is accommodated in the cylinder. The piston and the body define a pressure reduction chamber leading to a gas outlet provided through the body. The support member is provided inside the body, supports the valve mechanism from an upstream side, and has a communication passage that is provided in such a manner as to establish communication between a gas inlet provided through the body and the valve accommodation hole. The valve mechanism has a valve seat having a through-hole that serves as a gas flow channel, a valve body that is provided upstream of the valve seat and that has an urging member accommodation hole opening to an end portion of the valve mechanism on an opposite side of the valve seat, and an urging member that is interposed between a bottom surface of the urging member accommodation hole and the support member and that urges the valve body toward the valve seat. The support member is inserted in the urging member accommodation hole, has a distal end portion that supports the valve body via the urging member, and is provided with an inner introduction passage serving as a gas flow channel between an outer peripheral surface of the distal end portion and an inner peripheral surface of the urging member accommodation hole. An outer introduction passage that leads to the pressure reduction chamber from the valve accommodation hole is provided between an outer surface of the valve body and an inner surface of the valve accommodation hole. The inner introduction passage and the outer introduction passage are opposed, in an axial direction thereof, to the communication passage.

According to the aforementioned configuration, the communication passage is opposed to both the outer introduction passage and the inner introduction passage. Therefore, even in the case where gas flows into the valve accommodation hole from the gas inlet via the communication passage, the gas that has flowed into the valve accommodation hole flows into the inner introduction passage as well as the outer introduction passage. Therefore, the pressure that is generated due to the inflow of gas is dispersed to the outer introduction passage and the inner introduction passage. That is, while the pressure of the gas dispersed to the inner introduction passage acts as a force that pushes up the valve body downstream of the pressure reduction valve device, the pressure of the gas dispersed to the outer introduction passage acts as a pressure that pushes back the valve body upstream of the pressure reduction valve device. Therefore, the force that pushes up the valve body downstream of the pressure reduction valve device is suppressed, so appropriate operation of the valve body can be maintained. Besides, gas flows into the inner introduction passage as well as the outer introduction passage. Therefore, even when the moisture of gas flows into the outer introduction passage, the amount of moisture adhering to the interior of the outer introduction passage can be reduced. Therefore, even when the moisture inside the outer introduction passage freezes, appropriate operation of the valve body can be maintained.

According to the aforementioned pressure reduction valve device, an end portion of the valve body on a side where the urging member accommodation hole opens may be provided such that a wall thickness thereof decreases as a distance to the upstream side decreases. In the pressure reduction valve device, the outer introduction passage and the inner introduction passage are opposed, in the axial direction thereof, to the communication passage. Therefore, when gas flows into the valve accommodation hole, it is considered that the pressure resulting from the gas is applied to the end portion of the valve body where the urging member accommodation hole opens, and hence that a force is applied to press the valve body toward the valve seat. In this respect, according to the pressure reduction valve device, the wall thickness of the end portion of the valve body where the urging member accommodation hole opens is made smaller. Therefore, when gas flows into the valve accommodation hole, the end portion of the valve body where the urging member accommodation hole opens has a smaller area, so the area where the valve body is in contact with the gas in the axial direction thereof can be made smaller. Accordingly, the force by which the valve body is pushed up downstream of the pressure reduction valve device due to the pressure of gas can be suppressed.

According to the aforementioned pressure reduction valve device, a plurality of sliding regions that slide with respect to the inner surface of the valve accommodation hake may be provided along a circumferential direction of the valve body; and the outer introduction passage may be provided between those of the sliding regions which are adjacent to each other in the circumferential direction of the valve body.

The pressure reduction valve device according to the aspect can maintain appropriate operation of the valve body.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
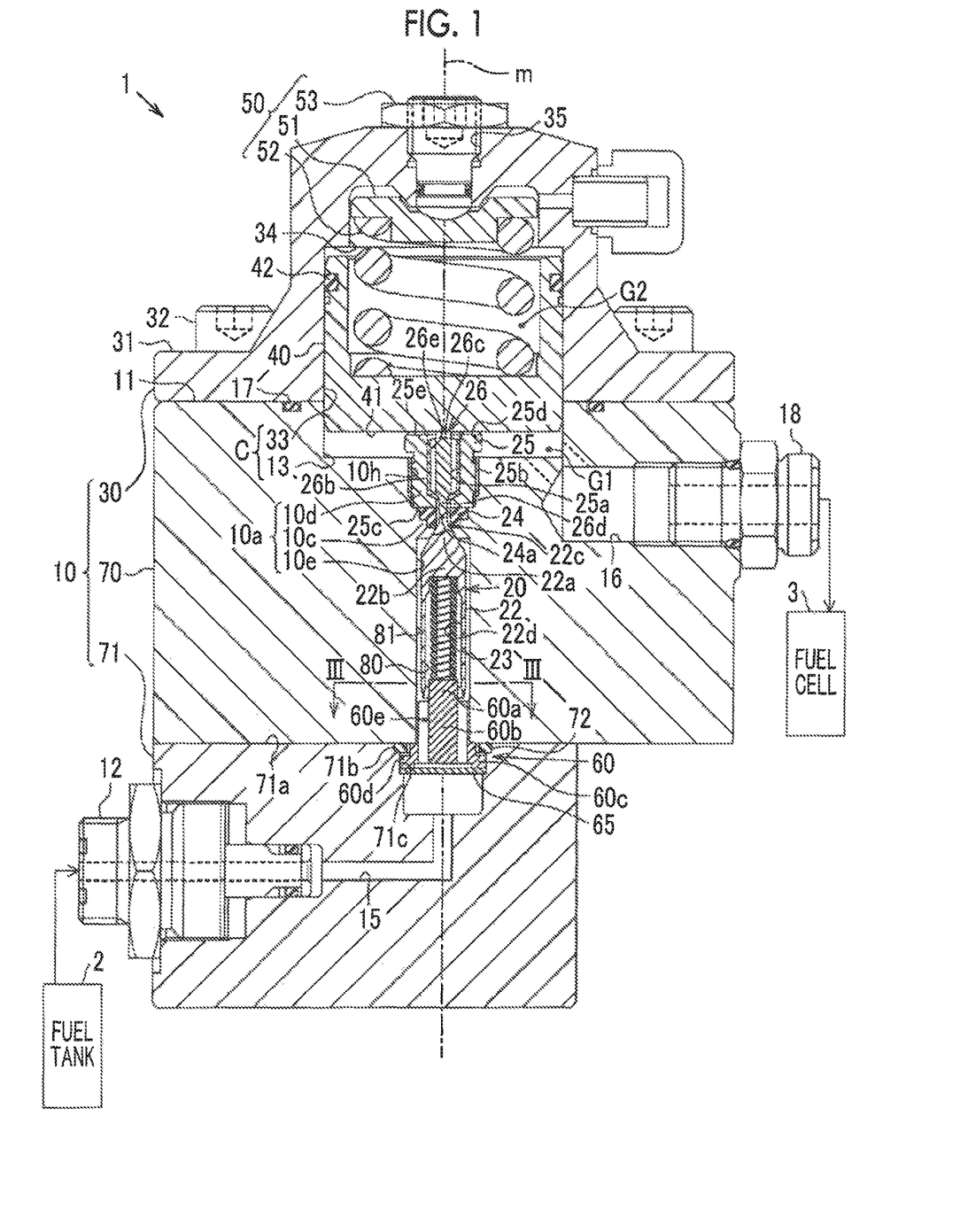
FIG. 1 is a cross-sectional view showing a partial cross-sectional structure of a pressure reduction valve device according to the embodiment of the disclosure.

One embodiment of the disclosure as a concretization of a pressure reduction valve device will be described hereinafter. As shown in FIG. 1, a pressure reduction valve device 1 is a piston-type pressure reduction valve device that is mounted in a fuel cell-powered vehicle, that reduces the pressure of high-pressure hydrogen gas supplied from a fuel tank 2 to a low pressure, and that supplies the hydrogen gas to a fuel cell 3. The pressure reduction valve device 1 is equipped with a body 10, a valve mechanism 20, and a support member 60. The body 10 has a first body 70, a second body 71, and a cover 30. The first body 70 and the second body 71 are assembled with each other in an axial direction thereof. The valve mechanism 20 and the support member 60 are accommodated inside the body 10 (to be exact, inside the first body 70 and the second body 71). The cover 30 is attached to a cover installation surface 11 that is provided on an end surface (an upper surface in FIG. 1) of the first body 70.

The first body 70 is equipped with a secondary port 18 serving as a gas outlet that is connected to the fuel cell 3 via a piping structure (not shown). Besides, the first body 70 has a first cylinder formation hole 13 that is concave and that opens to the cover installation surface 11, and a valve accommodation hole 10a that opens to a bottom wall of the first cylinder formation hole 13. The first cylinder formation hole 13 and the valve accommodation hole 10a are formed on a same axis m. The valve accommodation hole 10a penetrates the first body 70. The inner diameter of the valve accommodation hole 10a is set smaller than the inner diameter of the first cylinder formation hole 13. The valve accommodation hole 10a has a reduced diameter portion 10c formed in a non-end region thereof. The valve mechanism 20 is accommodated in the valve accommodation hole 10a. Furthermore, the first body 70 has a delivery passage 16 that establishes communication between the first cylinder formation hole 13 and the secondary port 18. The cover installation surface 11 of the first body 70 is provided with a sealing member 17 that seals a gap between the cover installation surface 11 and the cover 30. It should be noted herein that an O-ring is adopted as the sealing member 17.

The second body 71 is equipped with a primary port 12 serving as a gas inlet that is connected to the fuel tank 2. Besides, the second body 71 has a sealing member installation hole 71b that is concave and that opens to a first body installation surface 71a that is provided on an end surface thereof (an upper surface in FIG. 1) on the first body 70 side, and a support member accommodation hole 71c that is concave and that opens to a bottom wall of the sealing member installation hole 71b. The sealing member installation hole 71b and the support member accommodation hole 71c are formed on the same axis m. The inner diameter of the support member accommodation hole 71c is set smaller than the inner diameter of the sealing member installation hole 71b. A lower end portion of the support member 60 is accommodated in the support member accommodation hole 71c. The lower end portion of the support member 60 abuts on a step that is provided on an inner peripheral surface of the support member accommodation hole 71c, via a filter 65. A space is formed between the filter 65 and a bottom surface of the support member accommodation hole 71c. Besides, an upper end portion of the support member 60 is accommodated in the valve accommodation hole 10a. Furthermore, the second body 71 has a supply passage 15 that establishes communication between the primary port 12 and the support member accommodation hole 71c. The sealing member installation hole 71b of the second body 71 is provided with a sealing member 72 that seals a gap between the sealing member installation hole 71b and the first body 70. It should be noted herein that an O-ring is adopted as the sealing member 72.

The cover 30 is provided with a flange portion 31 at an end portion thereof on a side where the cover 30 is in contact with the cover installation surface 11 of the first body 70. The flange portion 31 is fastened to the first body 70 by a bolt 32, so the cover 30 is fixed to the first body 70. Besides, the cover 30 has a second cylinder formation hole 33 that is concave and that communicates with the first cylinder formation hole 13, a spring receiving accommodation hole 34 that is concave and that opens to a bottom wall of the second cylinder formation hole 33, and a screw hole 35 that opens to a bottom wall of the spring receiving accommodation hole 34 and that penetrates an outer surface of the cover 30. The second cylinder formation hole 33, the spring receiving accommodation hole 34, and the screw hole 35 are formed on the same axis m. The inner diameter of the second cylinder formation hole 33 is equal to the inner diameter of the first cylinder formation hole 13 of the first body 70. The inner diameter of the spring receiving accommodation hole 34 is set smaller than the inner diameter of the second cylinder formation hole 33. The inner diameter of the screw hole 35 is set smaller than the inner diameter of the spring receiving accommodation hole 34. A cylinder C is formed through compartmentalization by the first cylinder formation hole 13 and the second cylinder formation hole 33. The piston 40 is accommodated inside the cylinder C. The piston 40 is in the shape of a bottomed cylinder whose upper portion is open. The piston 40 has a pressure adjustment chamber G2, which is formed through compartmentalization inside the cylinder C on a side where the piston 40 opens. The piston 40 is accommodated inside the cylinder C with a bottom surface 41 thereof directed toward the valve mechanism 20 side. An outer peripheral surface of the piston 40 is provided with a sealing member 42 that seals a gap between the outer peripheral surface of the piston 40 and an inner peripheral surface of the second cylinder formation hole 33. It should be noted herein that an O-ring is adopted as the sealing member 42.

A piston urging member 50 is accommodated in the spring receiving accommodation hole 34 and the screw hole 35. The piston urging member 50 has a disk-shaped spring receiving member 51, a piston spring 52, and an adjustment screw 53. The spring receiving member 51 is accommodated in the spring receiving accommodation hole 34. The piston spring 52 is accommodated in a compressed state between the spring receiving member 51 and the piston 40 (to be exact, an inner peripheral surface of the piston 40). The piston 40 is urged toward the valve mechanism 20 due to an elastic force of this piston spring 52. The adjustment screw 53 is screwed to the screw hole 35. A distal end portion of the adjustment screw 53 is in contact with an end surface of the spring receiving member 51 on the screw hole 35 side. By screwing the adjustment screw 53 toward the piston 40, the adjustment screw 53 and the spring receiving member 51 move in such a direction as to approach the valve mechanism 20 along an axial direction of the cylinder C against the elastic force of the piston spring 52. As the spring receiving member 51 approaches the valve mechanism 20, the piston spring 52 is compressed, and the urging force toward the valve mechanism 20, which is applied to the piston 40 from the piston spring 52, can be increased. Incidentally, the adjustment screw 53 may be loosened in reducing the urging force applied to the piston 40 from the piston spring 52. By loosening the adjustment screw 53, the piston spring 52 is extended, and the urging force applied to the piston 40 can be reduced correspondingly.

Next, the valve mechanism 20 will be described. As shown in FIG. 1, the valve mechanism 20 has a valve body 22 that is accommodated inside the valve accommodation hole 10a, a valve spring 23 as an urging member, a valve seat 24, a plug 25, and a valve stem 26.

The valve seat 24 is fitted to an inner peripheral surface of the reduced diameter portion 10c of the valve accommodation hole 10a. The valve seat 24 is an annular resinous member that has a cylindrical through-hole 24a at a center thereof. The through-hole 24a functions as a gas flow channel. The valve accommodation hole 10a is compartmentalized into a first accommodation hole 10d and a second accommodation hole 10e by the valve seat 24. The first accommodation hole 10d is a region of the valve accommodation hole 10a that is located on the piston 40 side with respect to the valve seat 24. The second accommodation hole 10e is a region of the valve accommodation hole 10a that is located on the second body 71 side with respect to the valve seat 24. The plug 25 and the valve stem 26 are accommodated in the first accommodation hole 10d. The valve body 22 and the valve spring 23 are accommodated in the second accommodation hole 10e. That is, the valve body 22 and the valve spring 23 are provided upstream of the valve seat 24, and the plug 25 and the valve stem 26 are provided downstream of the valve seat 24. An internal thread portion 10h is formed in an inner peripheral surface of the first accommodation hole 10d. The upper end portion of the support member 60 is fitted to an opening portion of the second accommodation hole 10e on the second body 71 side.

The valve body 22 is a rod-shaped member that has a main body portion 22b and a distal end portion 22a that is provided at an end portion of the main body portion on the valve seat 24 side. The distal end portion 22a has a tapered surface whose diameter gradually increases as the distance to the main body portion 22b decreases. A slight gap is provided between an outer peripheral surface of the main body portion 22b and an inner peripheral surface of the second accommodation hole 10e. A columnar protrusion portion 22c is formed at a distal end of the distal end portion 22a. The outer diameter of the columnar protrusion portion 22c is set smaller than the inner diameter of the through-hole 24a of the valve seat 24. The columnar protrusion portion 22c is inserted in the through-hole 24a. Besides, a spring hole 22d that opens to an end portion on the opposite side of the columnar protrusion portion 22c is provided inside the main body portion 22b. The spring hole 22d functions as an urging member accommodation hole. The valve spring 23 is accommodated in a compressed state between a bottom surface of the spring hole 22d and an upper end surface of the support member 60. The valve spring 23 functions as an urging member. The valve body 22 is urged toward the valve seat 24 due to an elastic force of this valve spring 23.

Figure 3:
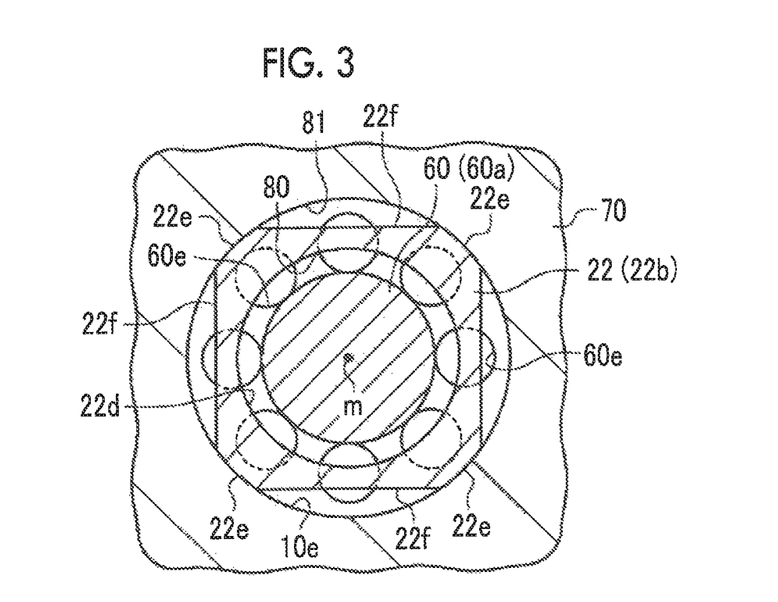
FIG. 3 is a cross-sectional view showing a cross-sectional structure of a support member and valve body of the pressure reduction valve device according to the embodiment of the disclosure, cut along a radial direction thereof.

As shown in FIG. 3, four sliding surfaces 22e and four flow channel formation surfaces 22f are provided on an outer surface of the main body portion 22b of the valve body 22. The sliding surfaces 22e are sliding regions whose distance to the axis m is approximately equal to the radius of the second accommodation hole 10e of the first body 70. The flow channel formation surfaces 22f are regions whose distance to the axis m is shorter than the radius of the second accommodation hole 10e of the first body 70. The sliding surfaces 22e and the flow channel formation surfaces 22f are alternately provided in a circumferential direction of the valve body 22. Four gaps that are formed by the flow channel formation surfaces 22f and the inner peripheral surface of the second accommodation hole 10e function as outer introduction passages 81 serving as gas flow channels.

Figure 2:
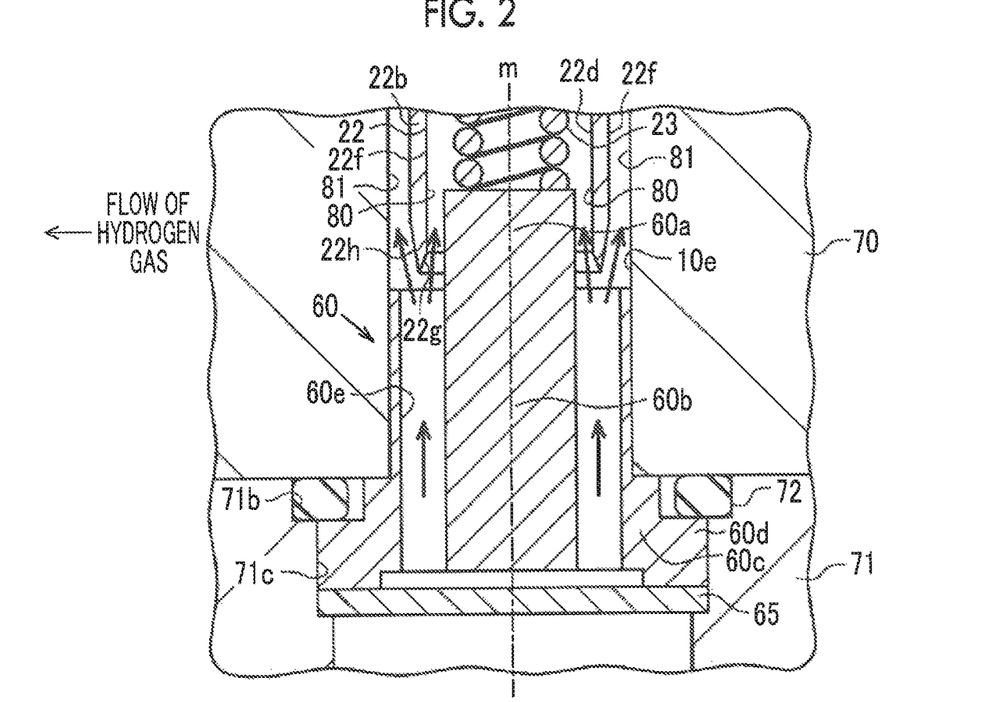
FIG. 2 is a cross-sectional view showing a cross-sectional structure of the periphery of a valve mechanism of the pressure reduction valve device according to the embodiment of the disclosure.

As shown in FIG. 2, the end portion of the valve body 22 where the spring hole 22d opens is small in wall thickness. In concrete terms, the main body portion 22b is provided with a taper 22g provided on an inner peripheral edge of the opening portion of the spring hole 22d. The taper 22g is provided such that the inner diameter thereof increases as the distance to the second body 71 decreases. The main body portion 22b has a taper 22h provided on an outer peripheral edge of the opening portion of the main body portion 22b. The taper 22h is provided such that the contour thereof contracts as the distance to the second body 71 decreases. The taper 22g and the taper 22h intersect with each other at the end portion of the valve body 22 on the second body 71 side. That is, the taper 22g and the taper 22h are provided such that the end portion of the valve body 22 where the spring hole 22d opens has a substantially V-shaped cross-section when cut along an axial direction thereof. Incidentally, a comparison between the taper 22g and the taper 22h reveals that the gradient of the taper 22g with respect to the axis m is larger than the gradient of the taper 22h with respect to the axis m.

As shown in FIG. 1, the plug 25 is a cylindrical member that has a cylindrical through-hole 25a at a center thereof. The valve stem 26 is accommodated inside the through-hole 25a. An external thread portion 25b is provided on an outer peripheral surface of the plug 25. The external thread portion 25b is screwed into the internal thread portion 10h that is provided in the inner peripheral surface of the first accommodation hole 10d of the first body 70, so the plug 25 is fixed to the first body 70. The plug 25 fixes the valve seat 24 to the first body 70 by sandwiching the valve seat 24 between one end surface 25c of the plug 25 on the valve body 22 side and a step that is formed through the provision of the reduced diameter portion 10c. One end surface 25c and the other end surface 25d of the plug 25 abut on a bottom surface 41 of the piston 40 inside the cylinder C. A flow channel groove 25e is provided in the other end surface 25d of the plug 25. The flow channel groove 25e is a concave groove that reaches the outer peripheral surface of the plug 25 from an inner peripheral surface of the through-hole 25a. By being surrounded by a peripheral surface of a region of the plug 25 that protrudes into the cylinder C, a bottom surface of the piston 40, and the cylinder C, a pressure reduction chamber is formed through compartmentalization.

The valve stem 26 assumes a columnar shape. A plurality of flow channel holes 26e extending in an axial direction of the valve stem 26 are formed through the valve stem 26 around a central axis thereof, at equal angular intervals. A distal end portion 26b (a lower end portion in FIG. 1) of the valve stem 26 is provided in a tapered manner such that the diameter thereof decreases as the distance to a distal end thereof decreases. A columnar protrusion portion 26d is formed at the distal end of the distal end portion 26b. The outer diameter of the columnar protrusion portion 26d is set smaller than the inner diameter of the through-hole 24a of the valve seat 24. The columnar protrusion portion 26d is inserted in the through-hole 24a. A distal end surface of the columnar protrusion portion 26d of the valve stem 26 abuts on a distal end surface of the columnar protrusion portion 22c of the valve body 22. Besides, a distal end surface of a proximal end portion 26c of the valve stem 26 abuts on the bottom surface 41 of the piston 40. Besides, an outer peripheral surface of the valve stem 26 is slidably in contact with the inner peripheral surface of the through-hole 25a of the plug 25. Incidentally, when the piston 40 abuts on the plug 25, the valve body 22 of the valve mechanism 20 has moved away from the valve seat 24, and the valve mechanism 20 is open.

Figure 4:
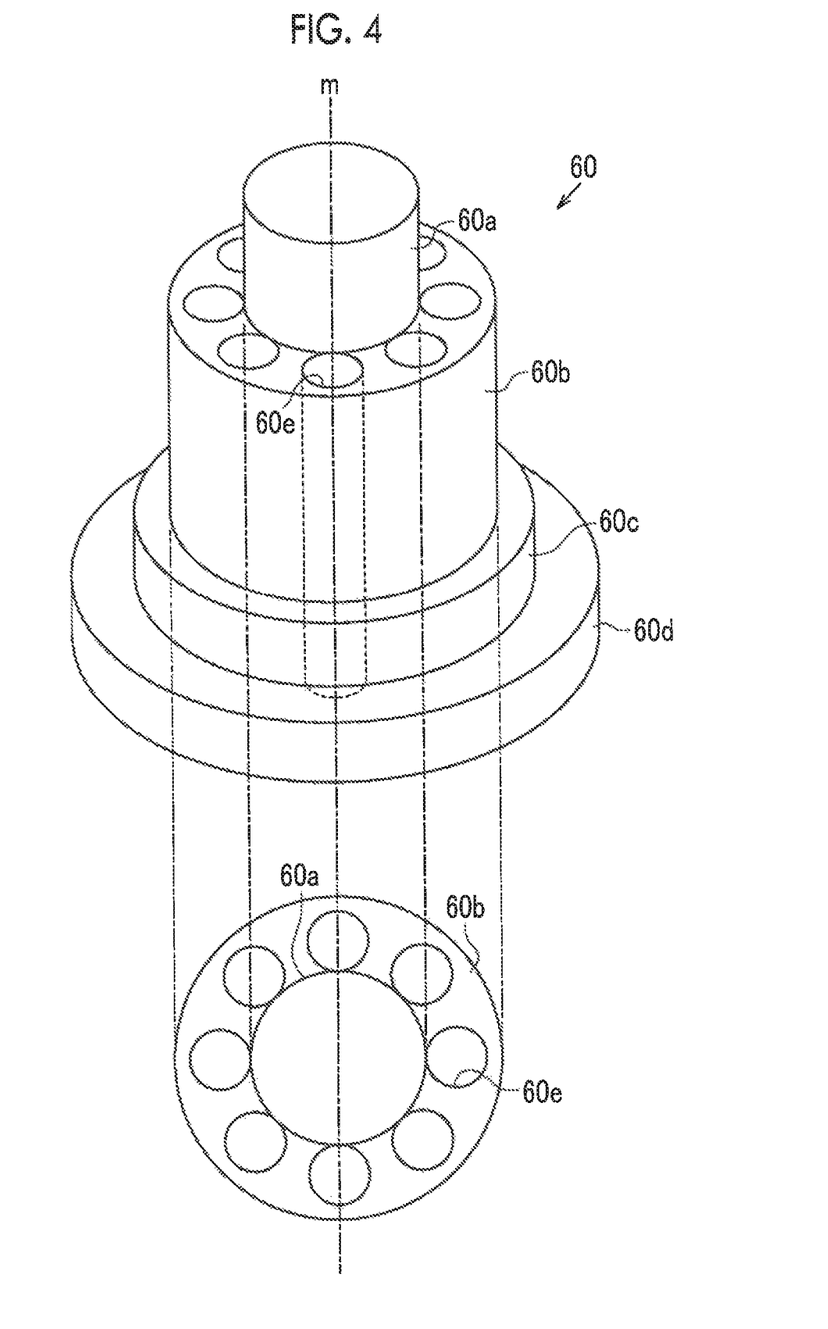
FIG. 4 is a perspective view showing an overall configuration of the support member in the valve mechanism according to the embodiment of the disclosure.

Next, the support member 60 will be described in detail. As shown in FIG. 4, the support member 60 has a cylindrical distal end portion 60a, a cylindrical main body portion 60b, a first flange portion 60c that assumes an annular shape, and a second flange portion 60d that assumes an annular shape. The distal end portion 60a, the main body portion 60b, the first flange portion 60c, and the second flange portion 60d are formed on the same axis m. The distal end portion 60a is provided on an end surface (an upper end surface in FIG. 4) of the main body portion 60b on the valve mechanism 20 side. The first flange portion 60c is provided on an outer peripheral surface of an end portion of the main body portion 60b on the second body 71 side (a lower side in FIG. 4). The second flange portion 60d is provided on an outer peripheral surface of an end portion of the first flange portion 60c on the second body 71 side (the lower side in FIG. 4). The outer diameter of the distal end portion 60a is set smaller than the outer diameter of the main body portion 60b. The outer diameter of the main body portion 60b is set smaller than the outer diameter of the first flange portion 60c. The outer diameter of the second flange portion 60d is set larger than the outer diameter of the first flange portion 60c.

The main body portion 60b has a plurality of (e.g., eight) communication holes 60e that penetrate the main body portion 60b in an axial direction thereof. The communication holes 60e function as communication passages. The communication holes 60e are provided at equal intervals along a circumferential direction of the main body portion 60b. The respective communication holes 60e are provided around the distal end portion 60a on an upper surface of the main body portion 60b. The main body portion 60b is provided with the communication holes 60e such that the contour of the communication holes 60e falls within a range between the contour of the distal end portion 60a and the contour of the main body portion 60b as viewed from the axial direction.

As shown in FIG. 2, the outer diameter of the distal end portion 60a is set slightly smaller than the inner diameter of the spring hole 22d of the valve body 22. The outer diameter of the main body portion 60b is set slightly larger than the inner diameter of the valve accommodation hole 10a. of the first body 70. The outer diameter of the second flange portion 60d is set slightly larger than the inner diameter of the support member accommodation hole 71c of the second body 71.

The upper surface of the first flange portion 60c of the support member 60 abuts on a lower end surface (a lower side in FIG. 2) of the first body 70. The second flange portion 60d of the support member 60, which is contracted in the radial direction thereof, is fitted in the support member accommodation hole 71c of the second body 71. Besides, the second flange portion 60d is provided with the sealing member 72, which is contracted in the axial direction thereof, between an upper surface of the second flange portion 60d and a lower end surface (the lower side in FIG. 2) of the first body 70. Part of the main body portion 60b of the support member 60, which is contracted in the radial direction thereof, is fitted in the second accommodation hole 10e of the first body 70. The distal end portion 60a is inserted in the spring hole 22d, with the main body portion 60b fitted in the second accommodation hole 10e. A slight gap is formed between an outer peripheral surface of the distal end portion 60a and an inner peripheral surface of the spring hole 22d of the main body portion 22b of the valve body 22. This gap functions as an inner introduction passage 80 serving as a gas flow channel. The distal end portion 60a abuts on the valve spring 23 that is accommodated in the spring hole 22d.

Next, a positional relationship among the communication holes 60e, the inner introduction passage 80, and the outer introduction passages 81 will be described. As shown in FIG. 3, the eight communication holes 60e are opposed to the inner introduction passage 80, which is partially formed by the inner peripheral surface of the spring hole 22d of the valve body 22 and the outer peripheral surface of the distal end portion 60a of the support member 60, in the direction of the axis m. Besides, four of the eight communication holes 60e are opposed to the four outer introduction passages 81, which are partially formed through compartmentalization by the flow channel formation surfaces 22f of the main body portion 22b of the valve body 22 and the inner peripheral surface of the second accommodation hole 10e of the first body 70, in the direction of the axis m, respectively.

Next, the operation of the pressure reduction valve device 1 will be described. In the pressure reduction valve device 1, high-pressure hydrogen gas that is supplied to the primary port 12 from the fuel tank 2 is introduced into the second accommodation hole 10e of the first body 70 via the supply passage 15 and the communication holes 60e of the support member 60.

As shown in FIG. 2, the hydrogen gas introduced into the second accommodation hole 10e flows into the inner introduction passage 80 and the outer introduction passages 81. As shown in FIG. 1, when the valve mechanism 20 is open, the hydrogen gas that has flowed into the outer introduction passages 81 passes through the through-hole 24a of the valve seat 24, and flows into the through-hole 25a of the plug 25. The hydrogen gas that has flowed into the through-hole 25a is introduced into the pressure reduction chamber G1 via the flow channel groove 25e of the plug 25 after flowing through the flow channel holes 26e of the valve stern 26. Then, the hydrogen gas introduced into the pressure reduction chamber G1 is supplied to the fuel cell 3 via the delivery passage 16 and the secondary port 18.

It should be noted herein that the internal pressure of the pressure reduction chamber G1 rises through the supply of hydrogen gas to the pressure reduction valve device 1 from the fuel tank 2. When the internal pressure of the pressure reduction chamber G1 becomes higher than the internal pressure of the pressure adjustment chamber G2, a force that is produced on the piston 40 due to a differential pressure between the internal pressure of the pressure reduction chamber G1 and the internal pressure of the pressure adjustment chamber G2 acts in such a direction as to resist the urging force of the piston spring 52, so the piston 40 moves away from the plug 25. The valve stern 26 and the valve body 22 move to the piston 40 side in such a manner as to be interlocked with the movement of this piston 40. The valve body 22 soon comes into abutment on the valve seat 24, and the valve body closes up the through-hole 24a of the valve seat 24. That is, the valve mechanism 20 is closed. Thus, the supply of hydrogen gas to the pressure reduction chamber G1 is stopped, so the internal pressure of the pressure reduction chamber G1 falls as hydrogen gas is delivered from the delivery passage 16. When the internal pressure of the pressure reduction chamber G1 becomes lower than the internal pressure of the pressure adjustment chamber G2, the piston 40 moves in such a direction as to approach the plug 25, due to the force that is produced on the piston 40 due to the differential pressure between the internal pressure of the pressure reduction chamber G1 and the internal pressure of the pressure adjustment chamber G2, and the urging force of the piston spring 52. The valve stem 26 and the valve body 22 move to the support member 60 side in such a manner as to be interlocked with the movement of this piston 40, so the valve body 22 moves away from the valve seat 24. That is, the valve mechanism 20 is opened. Thus, hydrogen gas is supplied again to the pressure reduction chamber G1, so the internal pressure of the pressure reduction chamber G1 rises. In the pressure reduction valve device 1, through repetition of this opening/closing operation of the valve mechanism 20, the pressure of the high-pressure hydrogen gas supplied from the fuel tank 2 via the primary port 12 is reduced to a predetermined pressure, and the hydrogen gas whose pressure has been reduced is supplied to the fuel cell 3 via the secondary port 18.

As described above in detail, the following operation and effects are obtained from the pressure reduction valve device according to the present embodiment of the disclosure. (1) The communication holes 60e of the support member 60 are opposed, in the axial direction thereof, to both the four outer introduction passages 81 and the inner introduction passage 80. Therefore, even in the case where hydrogen gas flows into the second accommodation hole 10e from the primary port 12 via the communication holes 60e, the hydrogen gas that has flowed into the second accommodation hole 10e flows into the inner introduction passage 80 as well as the outer introduction passages 81. Therefore, the pressure that is generated through the inflow of hydrogen gas is dispersed to the outer introduction passages 81 and the inner introduction passage 80. While the pressure of hydrogen gas dispersed to the inner introduction passage 80 acts as a force that pushes up the valve body 22 downstream of the pressure reduction valve device 1, the pressure of hydrogen gas dispersed to the outer introduction passages 81 acts as a force that pushes back the valve body 22 upstream of the pressure reduction valve device 1. Therefore, the force that pushes up the valve body 22 downstream of the pressure reduction valve device 1 is suppressed, so appropriate operation of the valve body 22 can be maintained. Besides, hydrogen gas flows into the inner introduction passage 80 as well as the outer introduction passages 81. Therefore, even when the moisture of hydrogen gas flows into the outer introduction passages 81, the amount of moisture adhering to the interiors of the outer introduction passages 81 can be reduced. Therefore, even when the moisture inside the outer introduction passages 81 freezes, appropriate operation of the valve body 22 can be maintained.

(2) In the pressure reduction valve device, the outer introduction passages 81 and the inner introduction passage 80 are opposed, in the axial direction thereof, to the communication holes 60e of the support member 60. Therefore, even when hydrogen gas flows into the second accommodation hole 10e, it is considered that the pressure resulting from hydrogen gas is applied to the end portion of the valve body 22 where the spring hole 22d opens, and hence that a force is applied to press the valve body 22 toward the valve seat 24. In this respect, according to the pressure reduction valve device 1, the taper 22g is provided on the inner peripheral edge of the opening portion of the end portion of the valve body 22 where the spring hole 22d opens, and the taper 22h is provided on the outer peripheral edge of the opening portion of the end portion of the valve body 22 where the spring hole 22d opens. Thus, the wall thickness of the end portion of the valve body 22 where the spring hole 22d opens is made smaller. Therefore, when hydrogen gas flows into the second accommodation hole 10e, the end portion of the valve body 22 where the spring hole 22d opens has a smaller area, so the area where the valve body 22 is in contact with hydrogen gas in the axial direction thereof can be made smaller. Accordingly, the force by which the valve body 22 is pushed up downstream of the pressure reduction valve device 1 due to the pressure of gas can be suppressed. The hydrogen gas flowing into the second accommodation hole 10e smoothly flows, in a dispersed manner, into the inner introduction passage 80 and the outer introduction passages 81 due to the tapers 22g and 22h.

Incidentally, the present embodiment of the disclosure may be changed as follows within such a range that there is no technical contradiction. In the present embodiment of the disclosure, the spaces that are surrounded by the flow channel formation surfaces 22f of the valve body 22 and the second accommodation hole 10e of the first body 70 are used as the outer introduction passages 81, but the disclosure is not limited thereto. For example, the outer surface of the main body portion 22b of the valve body 22 may be formed in the shape of a cylinder having an inner diameter slightly smaller than the inner diameter of the second accommodation hole 10e of the first body 70. By adopting this configuration, the outer introduction passages 81 are provided along the entire outer periphery of the valve body 22.

In the present embodiment of the disclosure, the wall thickness of the end portion of the valve body 2.2 where the spring hole 22d opens is made smaller. For example, however, instead of providing the end portion with the tapers 22g and 22h, the wall thickness of the distal end portion of the main body portion 22b of the valve body 22 where the spring hole 22d opens may be constant. It should be noted, however, that the communication holes 60e of the support member 60 are opposed, in the axial direction thereof, to the outer introduction passages 81 and the inner introduction passage 80, as in the foregoing embodiment of the disclosure.

Besides, in the present embodiment of the disclosure, the tapers 22g and 22h of the main body portion 22b are provided in such a manner as to intersect with each other. However, the tapers 22g and 22h may be provided in such a manner as not to intersect with each other. For example, an annular plane may be formed at the end portion of the valve body 22 where the spring hole 22d opens. That is, the cross-section obtained by cutting the end portion of the valve body 22 along the axial direction thereof may assume a trapezoidal shape. In this manner as well, the wall thickness of at least the end portion of the valve body 22 where the spring hole 22d opens may be made small.

Besides, in the present embodiment of the disclosure, the gradient of the taper 22g with respect to the axis m is made larger than the gradient of the taper 22h with respect to the axis m, but the disclosure is not limited thereto. For example, the gradient of the taper 22h with respect to the axis in may be made larger than the gradient of the taper 22g with respect to the axis m. The flow rates of hydrogen gas caused to flow into the outer introduction passages 81 and the inner introduction passage 80 may be adjusted by adjusting the gradients of the tapers 22g and 22h.

In the present embodiment of the disclosure, the valve accommodation hole 10a is formed through the first body 70, but the disclosure is not limited thereto. For example, a housing as a separate member may be provided inside the first body 70, and a valve accommodation hole may be provided through the interior of the housing.

In the present embodiment of the disclosure, the cylinder C is formed through compartmentalization by the first cylinder formation hole 13 of the first body 70 and the second cylinder formation hole 33 of the cover 30, but the disclosure is not limited thereto. For example, the cylinder C may be formed only by the second cylinder formation hole 33 of the cover 30. In this case, the first cylinder formation hole 13 of the first body 70 may be dispensed with.

In the present embodiment of the disclosure, as shown in FIG. 4, the main body portion 60b of the support member 60 is provided with the communication holes 60e such that the contour thereof falls within the range between the contour of the distal end portion 60a and the contour of the main body portion 60b as viewed from the axial direction, but the disclosure is not limited thereto. For example, the contour of the communication holes 60e may partially open to an outer peripheral surface of the main body portion 60b. That is, an arc surface-shaped groove is provided in the outer peripheral surface of the main body portion 60b. In this case, with the main body portion 60b fitted in the second accommodation hole 10e of the first body 70, the space enclosed by the groove and the inner peripheral surface of the second accommodation hole 10e functions as the communication holes 60e. Incidentally, the communication holes 60e are opposed, in the axial direction thereof, to the outer introduction passages 81 and the inner introduction passage 80.

In the present embodiment of the disclosure, the support member 60 is provided with the eight communication holes 60e, but the disclosure is not limited thereto. For example, the number of communication holes 60e may be smaller than eight. It should be noted, however, that when, for example, the main body portion 60b is provided with three communication holes 60e, at least one of the three communication holes 60e is arranged opposed to the outer introduction passages 81 and the inner introduction passage 80 in the axial direction. That is, when the valve body 22 and the support member 60 are accommodated in the second accommodation hole 10e of the first body 70, the phases of the outer introduction passages 81 and the communication holes 60e in the circumferential direction thereof are taken into account. Besides, the number of communication holes 60e may he larger than eight. In this manner, even in the case where the phases of the outer introduction passages 81 and the communication holes 60e in the circumferential direction thereof are not taken into account when the valve body 22 and the main body portion 60b of the support member 60 are accommodated in the second accommodation hole 10e of the first body 70, at least one of the communication holes 60e can be opposed, in the axial direction thereof, to the outer introduction passages 81 and the inner introduction passage 80.

Besides, in the present embodiment of the disclosure, the four outer introduction passages 81 that are formed by being surrounded by the flow channel formation surfaces 22f of the main body portion 22b of the valve body 22 and the inner peripheral surface of the second accommodation hole 10e are provided, but the disclosure is not limited thereto. For example, five or more outer introduction passages 81 may be provided. In this case, the number of outer introduction passages 81 can be made large by increasing the number of flow channel formation surfaces 22f on the outer surface of the main body portion 22b. Even in the case where the number of communication holes 60e of the support member 60 is small, the likelihood of the outer introduction passages 81 and the communication holes 60e being opposed to each other respectively in the axial direction thereof increases as the number of outer introduction passages 81 is increased. Therefore, when the valve body 22 and the main body portion 60b of the support member 60 are accommodated in the second accommodation hole 10e, the phases of the outer introduction passages 81 and the communication holes 60e in the circumferential direction thereof do not need to be taken into account.

In the present embodiment of the disclosure, the pressure reduction valve device 1 is mounted in the fuel cell-powered vehicle. However, the pressure reduction valve device may be mounted in vehicles other than the fuel cell-powered vehicle, in this case, the pressure reduction valve device 1 may handle a gas other than hydrogen gas.

Next, technical thoughts that can be grasped from the aforementioned embodiment of the disclosure will be described. (i) The plurality of the outer introduction passages are provided, and the phases of the outer introduction passages and the communication holes in the circumferential direction thereof are offset from each other respectively such that the communication holes are opposed, in the axial direction thereof, to at least one of the outer introduction passages.

According to the aforementioned configuration, the communication holes can be opposed, in the axial direction thereof, to at least one of the outer introduction passages. (ii) The number of communication holes and the number of outer introduction passages are different from each other.

According to the aforementioned configuration, the number of communication holes and the number of outer introduction passages are different from each other, so the phases of the communication holes in the circumferential direction thereof and the phases of the outer introduction passages in the circumferential direction thereof are offset from each other respectively. Therefore, the communication holes are likely to be opposed, in the axial direction thereof, to the outer introduction passages respectively.

What is claimed is:

1. A pressure reduction valve device comprising:
a body that has a valve accommodation hole;
a valve mechanism that is accommodated in the valve accommodation hole;
a cylinder that is provided on the body downstream of the valve mechanism;
a piston that is accommodated in the cylinder, the piston and the body defining a pressure reduction chamber leading to a gas outlet provided through the body; and
a support member that is provided inside the body, that supports the valve mechanism from an upstream side, and that has a communication passage establishing communication between a gas inlet provided through the body and the valve accommodation hole, wherein
the valve mechanism has a valve seat having a through-hole that serves as a gas flow channel, a valve body that is provided upstream of the valve seat and that has an urging member accommodation hole opening to an end portion of the valve mechanism on an opposite side of the valve seat, and an urging member that is interposed between a bottom surface of the urging member accommodation hole and the support member and that urges the valve body toward the valve seat,
the support member is inserted in the urging member accommodation hole, has a distal end portion that supports the valve body via the urging member, and forms an inner introduction passage between an outer peripheral surface of the distal end portion and an inner surface of the valve body forming the urging member accommodation hole, the inner introduction passage being configured such that gas flowing into the inner introduction passage exerts a force on the valve body in a downstream direction,
an outer introduction passage that leads to the pressure reduction chamber from the valve accommodation hole is formed between an outer surface of the valve body and an inner surface of the body forming the valve accommodation hole, and
both the inner introduction passage and the outer introduction passage overlap with the communication passage when viewed in an axial direction of the valve body.

2. The pressure reduction valve device according to claim 1, wherein
a wall thickness of an end portion of the valve body on a side where the urging member accommodation hole opens decreases as a distance to the upstream side decreases.

3. The pressure reduction valve device according to claim 1, wherein
a plurality of sliding regions that slide with respect to the inner surface of the body forming the valve accommodation hole are provided along a periphery of the valve body, and
the outer introduction passage is provided between those of the sliding regions which are adjacent to each other in a circumferential direction of the valve body.

* * * * *